United States Patent Office 3,804,857
Patented Apr. 16, 1974

3,804,857
BENZO-DITHIAPYRONE DICARBOXYLIC ACIDS
Hugh Cairns, Loughborough, and Richard Hazard, Cropston, England, assignors to Fisons Limited, London, England
No Drawing. Filed June 13, 1972, Ser. No. 262,334
Claims priority, application Great Britain, June 24, 1971, 29,573/71
Int. Cl. A61k 27/00; C07d 65/08
U.S. Cl. 260—327 TH            9 Claims

ABSTRACT OF THE DISCLOSURE

There are described compounds of Formula I,

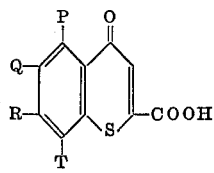

in which
an adjacent pair of P, Q, R and T form a chain
—CO—CH=C(COOH)—S—, and
the remainder of P, Q, R and T, which may be the same or different, each represent hydrogen; alkyl; alkoxy; alkenyl; alkenyloxy; alkyl or alkoxy substituted by a hydroxy, alkoxy, aryl or halo group; amino; mono- or di-lower alkyl amino; aminoalkoxy; amino alkoxy substituted by a lower alkyl group; nitro; hydroxy; halogen; acyl or aryloxy.

and pharmaceutically acceptable derivatives thereof.
There are also disclosed pharmaceutical compositions for treating intrinsic and allergic asthma containing the compounds and methods for making the compounds.

---

This invention relates to benzodithiapyrones, processes for their production and compositions containing them.

According to our invention we provide compounds of Formula I,

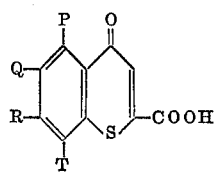

in which
an adjacent pair of P, Q, R, and T form a chain
—CO—CH=C(COOH)—S—,
and
the remainder of P, Q, R and T, which may be the same or different, each represent hydrogen; alkyl; alkoxy; alkenyl; alkenyloxy; alkyl or alkoxy substituted by a hydroxy, alkoxy, aryl or halo group; amino; mono- or di-lower alkyl amino; aminoalkoxy; amino alkoxy substituted by a lower alkyl group; nitro; hydroxy; halogen; acyl or aryloxy.

and pharmaceutically acceptable derivatives thereof.
According to our invention we also provide a process for the production of a compound of Formula I, or a pharmaceutically acceptable derivative thereof, which comprises cyclizing a compound of formula II,

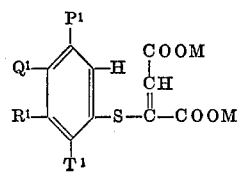

in which
an adjacent pair of $P^1$, $Q^1$, $R^1$ and $T^1$ together represent a chain —CO—CH=C(COOM)—S—, or represent the groups —H and

—S—C(COOM(=CH—COOM, and the remainder of $P^1$, $Q^1$, $R^1$ and $T^1$, which may be the same or different, each have the same significances as the remainder of P, Q, R and T above, and
M represents hydrogen or an alkali metal, and where desired or necessary converting the compound of Formula I to a pharmaceutically acceptable derivative thereof.

The cyclization may be carried out by treating the compound of formula II with a cyclizing agent at ambient temperature or above. Suitable cyclizing agents include dehydrating agents, such as concentrated acids, e.g. polyphosphoric acid, sulphuric acid, chlorosulphonic acid and other Lewis acids. When a dehydrating agent is used the reaction is preferably carried out under anhydrous conditions and it is preferred to subject the compound of Formula II to a drying step before use.

Alternatively the process may be effected by converting the —COOM groups of the compound of Formula II to acyl halide groups, e.g. by treatment with $PCl_3$, $PCl_5$ or $SOCL_2$, and subjecting the resulting acyl halide to an intramolecular Friedel-Crafts reaction.

The compounds of Formula II may be made by reaction of a compound of Formula V,

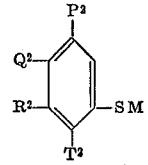

in which
M is as defined above, and $P^2$, $Q^2$, $R^2$ and $T^2$ have the same significance as $P^1$, $Q^1$, $R^1$ and $T^1$ above save that an adjacent pair of $P^2$, $Q^2$, $R^2$ and $T^2$ may represent the groups —H and —SM, with acetylene dicarbxylic acid, or an ester, or salt thereof, under alkaline conditions to produce a product which is either the desired product or may be hydrolysed to yield the desired product. Where an ester is used an ester derived from a $C_1$ to $_{10}$, or desirably from a $C_1$ to $_4$, alcohol is preferred. The alkaline conditions may be provided by an organic base, e.g. benzyl trimethyl ammonium hydroxide, by an alkali metal hydroxide, or conveniently by using an alkali metal salt, e.g. a sodium salt, of Formula V. The acetylene dicarboxylic acid, or the salt thereof and the compound of Formula V are preferably reacted in approximately stoichiometric amounts using excess alkali in aqueous solution. The reaction is preferably carried out at from about 50° to 150° C.

In the above reaction the acetylene dicarboxylate ester or acid may be replaced by an ester or acid of a monohalofumaric acid, or a precursor thereof. In this case the reaction is a condensation and involves the elimination of halogen acid or alkali metal halide between the halofumarate and the compound of Formula V. The reaction is therefore preferably carried out in the presence of an acid binding agent when M represents H, though other methods of eliminating the halogen acid may be used if desired. It is also possible to use a precursor of the halofumarate ester, e.g. a halomaleate or a dihalosuccinate ester. When precursors are used it may be necessary to provide extra alkali to ensure conversion of the precursor to the desired halofumarate ester.

Compounds of Formula V may be made by chlorosulphonation (or by sulphonation followed by conversion of the sulphonic acid group to a sulphonyl chloride group, e.g. by reaction with POCl$_3$) of the benzene nucleus to yield an appropriate compound containing a group of partial Formula X,

—SO$_2$Cl        (X)

and then reducing this group to give a thiophenol group of partial Formula XI,

—SH        (XI)

which may then, if desired, be converted to the corresponding alkali metal compound by conventional techniques.

The chlorosulphonation may be carried out using conventional techniques, for example using chlorosulphonic acid in an inert solvent, e.g. chloroform, at below about 0° C. The reduction of the chlorosulphonate to a thiophenol may be carried out, for example using stannous chloride under acidic conditions, which may be provided by hydrogen chloride and glacial acetic acid.

The compounds of Formula I and the intermediates therefor may be recovered and purified using techniques conventional in the recovery and purification of similar known compounds.

The process outlined above may produce the free acids of Formula I or may yield derivatives thereof. It is also within the scope of the present invention to treat the product of the above process, after any isolation and purification steps that may be desired, in order to liberate the free acid therefrom or to convert one form of derivative into another. The methods used to isolate and purify the product may be those conventionally used. Thus, salts may be prepared by the use of alkaline conditions during the recovery and purification of the compound. Alternatively, the free acid may be obtained and subsequently converted to a desired salt by neutralization with an appropriate base, e.g. an organic amine, or an alkali such as an alkali-metal or alkaline-earth metal hydroxide, carbonate or bicarbonate, preferably a mild base or alkali such as sodium carbonate or bicarbonate. Salts may also be made by treating an ester or amide with an appropriate base. Where the compound is recovered in the form of a salt, this salt may be converted to a more desirable salt, for example by a metathetical process. The esters and amides may be made by conventional techniques.

Pharmaceutically acceptable derivatives of the compounds of Formula I include pharmaceutically acceptable salts (notably water soluble salts), esters and amides of one or both of the carboxylic acid groups. Suitable salts include ammonium salts, alkali metal salts (e.g. sodium, potassium and lithium salts), alkaline earth metal salts (e.g. magnesium and calcium salts) and salts with organic bases, e.g. amine salts derived from mono-, di- or tri-lower alkyl or lower alkanolamines (such as triethanolamine or triethylamine), and salts with heterocyclic amines such as piperidine or pyridine.

Preferred pharmaceutically acceptable derivatives of the compounds of Formula I are the alkali-metal (e.g. sodium) salts.

The compounds of Formula I and pharmaceutically acceptable derivatives thereof are useful because they possess pharmacological activity in animals; in particular they are useful because they inhibit the release and/or action of pharmacological mediators which result from the in vivo combination of certain types of antibody and specific antigen e.g. the combination of reaginic antibody with specific antigen (see Example A below). In man, both subjective and objective changes which result from the inhalation of specific antigen by sensitized subjects are inhibited by prior administration of the new compounds. Thus the new compounds are useful in the treatment of asthma, e.g. allergic asthma. The new compounds are also useful in the treatment of so-called "intrinsic" asthma (in which no sensitivity to extrinsic antigen can be demonstrated). The new compounds are also useful in the treatment of other conditions in which antigen-antibody reactions are responsible for disease, for example, hay fever and urticaria.

For the above mentioned uses the dosage administered will, of course, vary with the compound employed, the mode of administration and the treatment desired. However, in general, satisfactory results are obtained when the compounds are administered at a dosage of from 0.1 to 50 mg. per kg. of animal body weight in the test set out in Example A. For man the total daily dosage is in the range of from about 1 mg. to 3500 mg. which may be administered in divided doses from 1 to 6 times a day or in sustained release form. Thus dosage forms suitable for administration (by inhalation or oesophageally) comprise from about 0.17 mg. to 600 mg. of the compound admixed with a solid or liquid pharmaceutically acceptable diluent or carrier.

According to our invention we also provide a pharmaceutical composition comprising (preferably a minor proportion of) a compound of Formula I, or a pharmaceutically acceptable derivative thereof, in combination with a pharmaceutically acceptable adjuvant, diluent or carrier. Examples of suitable adjuvants, diluents or carriers are: for tablets and dragées; lactose, starch, talc or stearic acid; for capsules, tartaric acid or lactose; for suppositories; natural or hardened oils or waxes; for inhalation compositions, coarse lactose. For use in inhalation compositions the compound of Formula I, or the pharmaceutically acceptable derivative thereof, preferably has a particle size of from 0.01 to 10 microns. The compositions may also contain suitable preserving, stabilizing and wetting agents, solubilizers, sweetening and coloring agents and flavoring. The compositions may, if desired, be formulated in sustained release form.

It is preferred that those of P, Q, R and T which do not form a chain —CO—CH=C(COOH)—S— are hydrogen; lower alkyl, e.g. methyl; lower alkoxy, e.g. methoxy; lower alkenyl, e.g. allyl; lower alkenyloxy, e.g. allyloxy; lower alkyl or lower alkoxy either of which may be substituted by a hydroxy, lower alkoxy (e.g. ethoxy), phenyl or halo (e.g. chloro or bromo) group; amino; mono- or di-lower alkyl amino, e.g. methylamino; amino-lower alkoxy, e.g. aminoethoxy; amino-lower alkoxy substituted by a lower alkyl group; nitro; hydroxy; halogen (e.g. chlorine or bromine); lower alkanoyl, e.g. acetyl; or phenoxy.

It is particularly preferred that those of P, Q, R and T which do not form a chain —CO—CH=C(COOH)—S— are hydrogen or a lower alkyl or a lower alkoxy group.

By the term "lower" we mean a group containing from 1 to 6 carbon atoms.

It will be appreciated that in the compounds of Formula I the chain —CO—CH=C(COOH)—S— may be bonded to the benzene ring in either sense.

The invention is illustrated, but in no way limited by the following examples.

EXAMPLE 1

4,10-dioxo-4H,10H-benzo[1,2-b:3,4-b']dithiapyran-2,8-dicarboxylic acid

To a solution of 4.5 parts of potassium hydroxide in 25 parts of water was added 2.8 parts of dithioresorcinol and the mixture was shaken to give a clear solution to which was added 6.5 parts of acetylenedicarboxylic acid monopotassium salt. The resulting solution was heated on a steam-bath for 40 minutes then it was allowed to cool, and was filtered then acidified with 5 Normal sulphuric acid solution. A precipitate was deposited which was filtered off washed with water and dried to leave 7.9 parts of a cream powder which was extracted into a mixture of 45 parts of diethyl ether and 16 parts of methanol. The solution was filtered and evaporated to give 6.3 parts of benzene-1,3-bis(thiofumaric acid)hemihydrate, melting point 231° C. (d.).

*Analysis.*—Found: C, 44.5; H, 2.64; S, 17.00%.

$$C_{14}H_{10}O_8S_2 \cdot \tfrac{1}{2} H_2O$$

requires: C, 44.4; H, 2.90; S, 16.90%.

To a stirred solution of 27 parts of chlorosulphonic acid was added 3.0 parts of benzene-1,3-bis(thiofumaric acid) hemihydrate, in small lots. The solution was stirred for 20 minutes then it was carefully diluted with 30 parts of concentrated sulphuric acid and finally heated briefly to 50° C. When the solution had cooled it was carefully poured into 200 parts of ice/water. A precipitate was obtained which was filtered firstly under gravity then under reduced pressure to leave an orange sludge which was crystallized from a dioxan/acetic acid/water mixture to give 1.6 parts of 4,10-dioxo-4H,10H-benzo[1,2-b:3,4-b'] dithiapyran-2,8-dicarboxylic acid, hemihydrate.

*Analysis.*—Found: C, 49.1; H, 1.99; S, 18.43%.

$$C_{14}H_6O_6S_2 \cdot \tfrac{1}{2} H_2O$$

requires: C, 49.0; H, 2.04; S, 18.65%.

A solution of 0.8 part of 4,10-dioxo-4H,10H-benzo [1,2-b:3,4-b']dithiapyran-2,8-dicarboxylic acid hemihydrate, and 0.196 part of sodium bicarbonate in 25 parts of water was prepared, filtered and freeze-dried to give 0.9 part of 4,10-dioxo-4H,10H-benzo[1,2-b:3,4-b']dithiapyran-2,8-dicarboxylic acid, disodium salt.

EXAMPLE 2

6-methoxy-4,10-dioxo-4H,10H-benzo[1,2-b:3,4-b'] dithiapyran-2,8-dicarboxylic acid To a solution of 4.5 parts of potassium hydroxide in 25 parts of water was added 3.44 parts of 4-methoxydithioresorcinol and the mixture was shaken to give a clear solution which was treated with 6.5 parts of acetylenedicarboxylic acid, monopotassium salt. The solution was heated on a steam-bath for 45 minutes then it was cooled, filtered and acidified with 5 Normal sulphuric acid solution. The mixture was extracted with ether, and the ethereal solution was dried over anhydrous magnesium sulphate then filtered and evaporated to leave a solid which was crushed and dried to give 7.3 parts of 4-methoxybenzene-1,3-bis(thiofumaric acid)hemihydrate, melting point 190° C. (d.).

*Analysis.*—Found: C, 44.6; H, 3.12; S, 15.23%.

$$C_{15}H_{12}O_9S_2 \cdot \tfrac{1}{2} H_2O$$

requires: C, 44.1 H, 3.18 S, 15.65%.

To a stirred solution of 27 parts of chlorosulphonic acid was added in small lots, 3.0 parts of 4-methoxybenzene-1, 3-bis(thiofumaric acid)hemihydrate. The solution was stirred for 20 minutes then it was carefully diluted with 30 parts of concentrated sulphuric acid, heated briefly to 50° C., cooled and poured into 200 parts of ice/water. A precipitate was obtained which was filtered firstly under gravity then under reduced pressure, then it was boiled with 100 parts of a 4/1 dioxan/water mixture. The mixture was cooled and filtered under gravity then the precipitate was dissolved in aqueous sodium bicarbonate solution and reprecipitated by acidification with 2 Normal hydrochloric acid. The solid was filtered off, washed with water, dried and crushed to give 1.7 parts of 6-methoxy-4,10-dioxo-4H,10H-benzo[1,2-b:3,4-b']dithiapyran - 2,8-dicarboxylic acid, monohydrate, melting point 270° C. (d.).

*Analysis.*—Found: C, 46.8; H, 2.12; S, 17.7%.

$$C_{15}H_8O_7S_2 \cdot H_2O$$

requires: C, 47.1; H, 2.62; S, 16.76%.

A solution of 1.0 part of 6-methoxy-4,10-dioxo-4H,10H-benzo[1,2-b:3,4-b']dithiapyran - 2,8 - dicarboxylic acid, monohydrate and 0.22 parts of sodium bicarbonate in 25 parts of water was prepared, filtered and freeze-dried to give 1.1 parts of 6-methoxy-4,10-dioxo-4H,10H-benzo[1, 2-b:3,4b']dithiapyran-2,8-dicarboxylic acid, disodium salt.

EXAMPLE 3

5,10-dimethyl-4,6-dioxo-4H,6H-benzo[1,2-b: 5,4-b'] dithiapyran-2,8-dicarboxylic acid To a solution of 9.0 parts of potassium hydroxide in 50 parts of water was added 6.8 parts of 2,5-dimethyldithioresorcinol. The mixture was shaken to give a clear solution which was treated with 13 parts of acetylene dicarboxylic acid, monopotassium salt. The resulting mixture was heated on a steam-bath for 45 minutes, then it was cooled, filtered and acidified with 20% v./v. sulphuric acid solution. An oil was precipitated which solidified upon scratching with a glass rod. The solid was filtered off and dried to leave an orange solid which was extracted into an ether/methanol mixture. The solution was filtered and evaporated to leave an orange solid which was crushed and dried to give 13.7 parts of 1,4-dimethylbenzene-2,6-bis(thiofumaric acid) hemihydrate, melting point, 235° C. (d).

*Analysis.*—Found: C, 47.0; H, 3.52; S, 15.95%.

$$C_{16}H_{14}O_8S_2 \cdot \tfrac{1}{2} H_2O$$

requires: C, 47.2; H, 3.68; S, 15.72%.

To a stirred solution of 27 parts of chlorosulphonic acid was added in small lots 3.0 parts of 1,4-dimethylbenzene-2,6-bis(thiofumaric acid) hemihydrate. The solution was stirred for 20 min. then it was cautiously diluted with 30 parts of concentrated sulphuric acid, heated briefly to 50° C., cooled and poured on to 200 parts of ice. A fine precipitate was obtained which was filtered off, firstly under gravity then under reduced pressure. The damp product was boiled with 80 parts of dioxan, cooled, and the insoluble material filtered off and crystallised from 450 parts of a 3/1 dioxan/water mixture to give 1.3 parts of 5,10 - dimethyl - 4,6-dioxo-4H,6H-benzo[1,2-b:5,4-b']dithiapyran-2,8-dicarboxylic acid, monohydrate, melting point 269° C. (d.).

*Analysis.*—Found: C, 50.3; H, 3.04; S, 16.33%.

$$C_{16}H_{10}O_6S_2 \cdot H_2O$$

requires: C, 50.6; H, 3.16; S, 16.85%.

A solution of 0.8 part of 5,10-dimethyl-4,6-dioxo-4H, 6H-benzo[1,2-b: 5,4-b']dithiapyran-2,8-dicarboxylic acid, monohydrate and 1.77 parts of sodium bicarbonate in 25 parts of water was prepared, filtered and freeze-dried to give 0.9 part of 5,10-dimethyl-4,6-dioxo-4H,6H-benzo-[1,2-b:5,4-b']dithiapyran-2,8-dicarboxylic acid, disodium salt.

EXAMPLE A

The procedure set out below may be used to assess the effectiveness of a compound in inhibiting the release of the pharmacological mediators of anaphylaxis.

In this test, the effectiveness of the compounds in inhibiting the passive cutaneous anaphylactic reaction in rats is assessed. It has been proved that this form of test gives reliable qualitative indications of the ability of the compounds under test to inhibit antibody-antigen reactions in man.

In this test method Charles River France/Fisons bred rats (male or female) having a body weight of from 100 to 150 gms. are infected subcutaneously at weekly intervals with *N. brasiliensis* larvae in doses increasing from about 2000 larvae per animal to 12,000 larvae per animal in order to establish the infection. After 8 weeks the rats are bled by heart puncture and 15–20 mls. of blood collected from each animal. The blood samples are then centrifuged at 3500 r.p.m. for 30 minutes in order to remove the blood cells from the blood plasma. The serum is collected and used to provide a serum containing *N. brasiliensis* antibody. A pilot sensitivity is carried out to determine the least quantity of serum required to give a skin weal in control animals in the test described below of 2 cm. diameter. It has been found that optimum sensitivity of rats in the body weight range 100–130 gms. is obtained using a serum diluted with eight parts of physiological saline solution. This diluted solution is called antibody serum A.

The antigen to react with the antibody in serum A is prepared by removing *N. brasiliensis* worms from the gut of the infested rats, centrifuging the homogenate and collecting the supernatant liquor. This liquor is diluted with saline to give a protein content of 1 mg./ml. and is known as solution B.

Charles River France/Fisons bred rats in the body weight range 100 to 130 gms. are sensitized by intradermal injection of 0.1 mls. of serum A into the right flank. Sensitivity is allowed to develop for 24 hours and the rats are then injected intravenously with 1 ml./100 gms. body weight of a mixture of solution B (0.25 mls.) Evans Blue dye solution (0.25 mls.) and the solution of the compound under test (0.5 mls. varying percentages of active matter). Insoluble compounds are administered as a separate intraperitioneal injection 5 minutes before intravenous administration of solution B and Evans Blue dye. For each percentage level of active matter in the solution under test five rats are injected. Five rats are used as controls in each test. The dosages of the compound under test are selected so as to give a range of inhibition values.

Thirty minutes after injection of solution B the rats are killed and the skins removed and reversed. The intensity of the anaphylactic reaction is assessed by comparing the size of the characteristic blue weal produced by spread of the Evans Blue dye from the sensitization site, with the size of the weal in the control animals. The size of the weal is rated as 0 (no weal detected, i.e. 100% inhibition) to 4 no difference in size of weal, i.e. no inhibition) and the percentage inhibition for each level calculated as:

Percent inhibition $$= \frac{(\text{Control group score} - \text{treated group score}) \times 100}{\text{Control group score}}$$

The percentage inhibitions for the various dose levels are plotted graphically for each compound. From these graphs the dosage required to achieve a 50% inhibition of the anaphylactic reaction ($ID_{50}$) may be determined.

The compounds are also evaluated in the above manner using intestinal and gastric administration of the compound.

We claim:
1. A compound of Formula I,

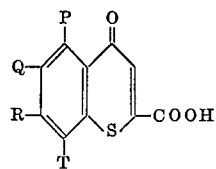

(I)

in which
an adjacent pair of P, Q, R and T form a chain

—CO—CH=C(COOH)—S— and
the remainder of P, Q, R and T, which may be the same or different, each represent hydrogen; lower alkyl; lower alkoxy; lower alkenyl; lower alkenyloxy; lower alkyl or lower alkoxy either of which may be substituted by a hydroxy, lower alkoxy, phenyl or halo group; amino; mono- or di- lower alkyl amino; amino-lower alkoxy; amino-lower alkoxy substituted by a lower alkyl group; nitro; hydroxy; halogen; lower alkanoyl or phenoxy.

2. A compound according to claim 1, wherein those of P, Q, R and T which do not form a chain

—CO—CH=C(COOH)—S— are hydrogen or a lower alkyl or a lower alkoxy group.

3. A compound according to claim 1 which is 4,10-dioxo-4H,10H-benzo[1,2-b:3,4-b']dithiapyran-2,8 - dicarboxylic acid.

4. A compound according to claim 1 which is 6-methoxy - 4,10 - dioxo - 4H,10H - benzo[1,2-b:3,4-b']dithiapyran-2,8-dicarboxylic acid.

5. A compound according to claim 1 which is 5,10-dimethyl - 4,6-dioxo-4H,6H-benzo[1,2-b:5,4-b']dithiapyran-2,8-dicarboxylic acid.

6. A compound according to claim 1 in the form of a pharmaceutically acceptable salt thereof.

7. A compound according to claim 6, in the form of a sodium salt thereof.

8. A compound according to claim 1 having a particle size of from 0.01 to 10 microns.

9. A compound of Formula II,

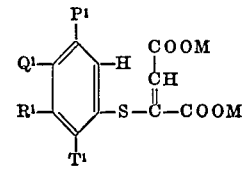

(II)

in which
an adjacent pair of $P^1$, $Q^1$, $R^1$ and $T^1$ together represent a chain —CO—CH=C(COOM)—S—, or represent the groups —H and —S—C(COOM)=CH—COOM, and the remainder of $P^1$, $Q^1$, $R^1$ and $T^1$, which may be the same or different, each represent hydrogen; lower alkyl; lower alkoxy; lower alkenyl; lower alkenyloxy; lower alkyl or lower alkoxy either of which may be substituted by a hydroxy, lower alkoxy, phenyl, or halo group; amino; mono- or di- lower alkyl amino; amino-lower alkoxy; amino-lower alkoxy substituted by a lower alkyl group; nitro; hydroxy; halogen; lower alkanoyl or phenoxy, and M represents hydrogen or an alkali metal.

References Cited
UNITED STATES PATENTS
3,714,190    1/1973    Boissier et al. ____ 260—327 TH HENRY R. JILES, Primary Examiner
C. M. S. JAISLE, Assistant Examiner U.S. Cl. X.R.
260—516; 424—275